United States Patent
Pirahesh et al.

(10) Patent No.: US 10,176,220 B2
(45) Date of Patent: Jan. 8, 2019

(54) EXECUTING GRAPH PATH QUERIES

(71) Applicant: International Business Machines Corporation, Armonk, NY (US)

(72) Inventors: Mir Hamid Pirahesh, San Jose, CA (US); Yuanyuan Tian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 14/967,684

(22) Filed: Dec. 14, 2015

(65) Prior Publication Data

US 2017/0169073 A1  Jun. 15, 2017

(51) Int. Cl.
*G06F 17/30* (2006.01)

(52) U.S. Cl.
CPC .. *G06F 17/30454* (2013.01); *G06F 17/30477* (2013.01); *G06F 17/30958* (2013.01)

(58) Field of Classification Search
CPC ........ G06F 17/30958; G06F 17/30321; G06F 17/30386; G06F 17/30979; G06F 17/30454; G06F 17/30463; G06F 17/30466; G06F 17/30477; G06F 17/30498; G06F 17/30961; G01C 21/3446; G01C 21/3492; Y10S 707/99933
USPC .............. 707/716, 798, 769, 718, 774, 713; 701/533; 706/46
See application file for complete search history.

(56) References Cited

U.S. PATENT DOCUMENTS

| | | | |
|---|---|---|---|
| 7,925,656 B2 * | 4/2011 | Liu | G06F 17/30938 707/714 |
| 8,117,189 B2 | 2/2012 | Bruno et al. | |
| 8,402,016 B2 | 3/2013 | Tsirogiannis et al. | |
| 8,639,397 B2 * | 1/2014 | Verlut | G01C 21/005 701/3 |
| 8,849,838 B2 | 9/2014 | Wang | |
| 8,972,337 B1 | 3/2015 | Gupta | |
| 9,053,210 B2 | 6/2015 | Elnikety et al. | |
| 9,092,481 B2 | 7/2015 | Digana | |
| 9,576,007 B1 * | 2/2017 | Sivathanu | G06F 17/30321 |
| 9,754,044 B2 * | 9/2017 | Singh | G06F 17/30899 |
| 2003/0061244 A1 | 3/2003 | Hirohata | |
| 2006/0167869 A1 * | 7/2006 | Jones | G06F 17/30929 |

(Continued)

OTHER PUBLICATIONS

Gong et al.; "Bloom Filter-based XML Packets Filtering for Millions of Path Queries"; Proceedings of the 21st International Conference on Data Engineering (Year: 2005).*

(Continued)

*Primary Examiner* — Dennis Truong
(74) *Attorney, Agent, or Firm* — Lieberman & Brandsorfer, LLC

(57) ABSTRACT

Embodiments of the invention relate to executing graph path queries. A database stores data entities and attributes in node tables and stores links between nodes in an edge table. Edges form a path between a source node and a target node. A source node set is generated and joined with the edge table to produce a first intermediate set. Similarly, a target node set is generated and joined with the edge table to produce a second intermediate set. A result path is generated through a joining of the first and second intermediate paths and application of a length condition.

17 Claims, 9 Drawing Sheets

(56) References Cited

U.S. PATENT DOCUMENTS

| | | | |
|---|---|---|---|
| 2009/0012923 A1* | 1/2009 | Moses | G06Q 10/10 706/46 |
| 2009/0097418 A1* | 4/2009 | Castillo | H04L 41/12 370/255 |
| 2009/0234829 A1 | 9/2009 | Gollapudi et al. | |
| 2011/0131198 A1 | 6/2011 | Johnson et al. | |
| 2012/0254153 A1* | 10/2012 | Abraham | G06F 17/30707 707/716 |
| 2012/0283948 A1* | 11/2012 | Demiryurek | G01C 21/3446 701/533 |
| 2014/0172810 A1* | 6/2014 | Paradies | G06F 17/30315 707/705 |
| 2014/0172914 A1* | 6/2014 | Elnikety | G06F 17/30958 707/774 |
| 2014/0280036 A1 | 9/2014 | Korlapati et al. | |
| 2014/0330807 A1 | 11/2014 | Weyerhaeuser et al. | |
| 2015/0149440 A1 | 5/2015 | Bomea et al. | |
| 2015/0324410 A1* | 11/2015 | Glover | G06F 17/30958 707/610 |
| 2015/0370919 A1* | 12/2015 | Bornhoevd | G06F 17/30958 707/798 |

OTHER PUBLICATIONS

Groppe et al., P-Luposdate: Using Precomputed Bloom Filters to Speed Up SPRAQL Processing in The Cloud, Open Journal of Semantic Web (OJSW), vol. 1, No. 2 (2014), pp. 25-55.

Goodman et al., "Optimizing Graph Queries With Graph Joins and Sprinkle SPARQL," 2014 IEEE International conference on Big Data (2014), pp. 17-24.

Trongratsameethong et al., Exhaustive Greedy Algorithm for Optimizing Intermediate Result Sizes of Join Queries, 2009 Eigth IEEE/Acts International Conference on Computer and Information Science (2009), pp. 463-468.

* cited by examiner

EXECUTING GRAPH PATH QUERIES

BACKGROUND

The present invention relates to executing graph path queries. More specifically, the invention relates to storing the graphs in a relational database with separate node and edge tables and executing a path query on the graphs utilizing the database table structure.

A graph is generally represented by sets of nodes, also referred to herein as vertices, and edges connecting the nodes. Each edge or node in the graph may include one or more relation conditions. A graph path query is a data structure that indicates at least a source node, a target node, and one or more edges connecting the source and target nodes. Processing a graph query evaluates the conditions and through various techniques produces a final result set.

The graph may be stored in a relational database, with a node table and an edge table. The node table stores a node identifier with associated node attributes, and the edge table stores identifiers of two or more nodes that the edge connects together with associated edge attributes. The node and edge tables may be updated by adding or removing nodes and edges in the respective tables. A path query employs the node and edge tables to find a path with a size restriction between nodes having two qualifiers.

SUMMARY

A method, system, and computer program product are provided to support execution of graph path queries, and dynamically adjusting the queries during query processing to mitigate processing of extraneous data.

In one aspect, a computer-implemented method is provided for processing a graph path query. The method utilizes a database with data entities and attributes stored in a table referred to as a node table, and links between nodes stored in another table referred to as an edge table. More specifically, the edge table stores data and attributes, with the data being edges between a source node and a target node. With respect to the node table, a selection condition is applied to the node table, and a set of source nodes is generated. A first path and associated first edge in the path is generated by joining the source node set with the edge table and application of an edge condition. The first path is traversed to produce a first intermediate set of paths with edges that satisfy the edge condition and with the path connecting the source nodes to a first set of intermediate nodes. A target node set is similarly produced, including application of a selection condition to the node table, and joining the target node set with the edge table through application of an edge condition. The second path associated with the target node set is created in a reverse direction to that of the source node set. A result path is returned by joining the first and second intermediate set of paths, with the join including an intersection of the first set of intermediate nodes with the second set of intermediate nodes, and application of a length condition to the set of result paths.

In another aspect, a computer program product is provided with a computer readable storage medium having computer readable program code embodied therewith. The program code is executable by a processor to process a graph path query with data entities and attributes stored in a node table and links between nodes identified in the node table stored in an edge table. The edge table includes a plurality of edges between a source node and a target node, and attributes of the edges. The processor executes the program code for the graph path query. More specifically, the processor applies a selection condition to the node table and generates a set of source nodes. The source node set is joined with the edge table, and the processor applies an edge condition to produce a first edge of a first plurality of edges in a first path. The processor executes code to traverse the first path, with the traversal including a joining of the first edge with the edge table to produce a first intermediate set of paths. More specifically, the first intermediate set of paths includes paths with edges satisfying the edge condition and connecting the source nodes to a first set of intermediate nodes. Similarly, the processor applies a selection condition to the node table and generates a set of target nodes. The target node set is joined with the edge table and the processor applies an edge condition to produce a second edge of a second plurality of edges in a second path. In a reverse direction to the source node set path traversal, the processor executes code to traverse the second path, with the traversal including a joining of the edge table with the second edges in the second path to produce a second intermediate set of paths. More specifically, the second intermediate set of paths includes paths with edges satisfying the edge condition and connecting the target nodes to a second set of intermediate nodes. The process executes code to join the first and second sets of intermediate paths to generate and return a result set of paths, which may include application of a length condition.

In a further aspect, a computer system is provided with a processing unit in communication with memory, and a functional unit in communication with the processing unit. The functional unit is configured with tools to process a graph path query with data entities and attributes stored in a node table and links between nodes identified in the node table stored in an edge table, with the edge table storing edges between a source node and a target node, and attributes of the edges. The functional unit comprises a source manager, a target manager, and in one embodiment an edge manager. The source manager is configured to apply a selection condition to the node table and generate a set of source nodes, join the source node set with the edge table and apply an edge condition, to produce a first edge of a first plurality of edges in a first path and to traverse the first path. The traversal of the first path joins the first edge with the edge table to produce a first intermediate set of paths. Specifically, the first intermediate set of paths comprises paths with edges that satisfy the edge condition and connect the source nodes to a first set of intermediate nodes. The target manager is configured to apply a selection condition to the node table and generate a set of target nodes, join the target node set with the edge table and apply the edge condition to produce a second edge of a second plurality of edges in a second path. Traversal of the second path is in a direction that is reversed from the traversal of the first path. More specifically, the target manager traverses the second path and joins the edge table with the second edges in the second path, to produce a second intermediate set of paths. Specifically, the second intermediate set of paths comprises paths with edges that satisfy the edge condition and connect the target nodes to a second set of intermediate nodes. A set of result paths is returned from joining the first and second intermediate sets of paths, with the joining including application of a length condition.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
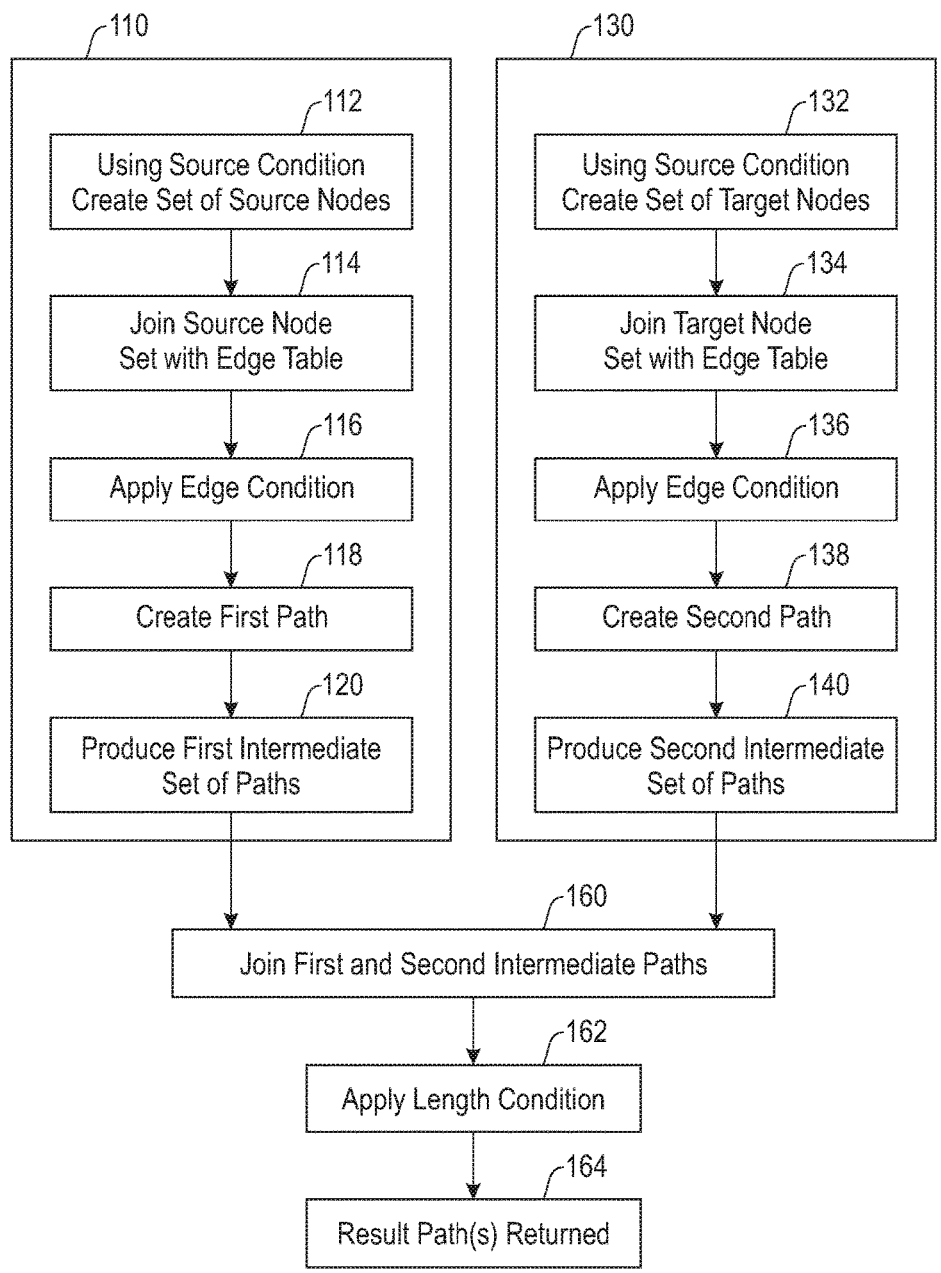
FIG. 1 depicts a flow chart illustrating processing of a graph query while minimizing intermediate results for processing.

A query may be applied to the database with a path size restriction and employing nodes with specific characteristics. It is known in the art to employ recursive joins to statically generate an execution plan. However, one drawback associated with the static planning is a large quantity of intermediate data that is created, which will require an extended length of time to execute the associated query. With reference to FIG. 1, a flow chart (100) is provided for processing a graph query while minimizing intermediate results for processing.

As shown, there are two parallel sub-processes. A first of the sub-processes (110) is directed to a set of source nodes, and a second of the sub-processes (130) is directed to a set of target nodes. Both the source nodes and the target nodes are created from the node tables in the database. Using a source condition applied to the node tables, a set of source nodes is created (112). The source node set is joined with the edge table(s) (114). In addition, an edge condition is applied (116), thereby creating a first path (118) producing a first intermediate set of paths (120). Accordingly, as shown at (110), a first intermediate set of paths is created connecting one or more source nodes to a first set of one or more intermediate nodes.

Similar to the first sub-process, the second sub-process (130) uses a target condition which is applied to the node tables to create a set of target nodes (132). The target node set is joined with the edge table(s) (134). An edge condition is applied (136), thereby creating a second path (138) producing a second intermediate set of paths (140). In one embodiment, as operations are executed, statistics may be collected after each operator or a sequence of operators, and an estimate of the operation is dynamically adjusted based on updated statistics. For example, the adjustment may include dynamically selecting an operator based on the estimate. Accordingly, as shown at (130), a second intermediate set of paths is created connecting one or more target nodes to a second set of intermediate nodes.

Once the first and second sets of intermediate paths have been produced (118) and (138), respectively, the first and second intermediate paths are joined (160), and a length condition is applied to the joined intermediate paths (162). In one embodiment, the joining of the first and second intermediate paths is an intersection of the nodes associated with each of the respective intermediate paths. Similarly, in one embodiment, application of the length condition applies a restriction to the resulting path that is returned (164).

Figure 2:
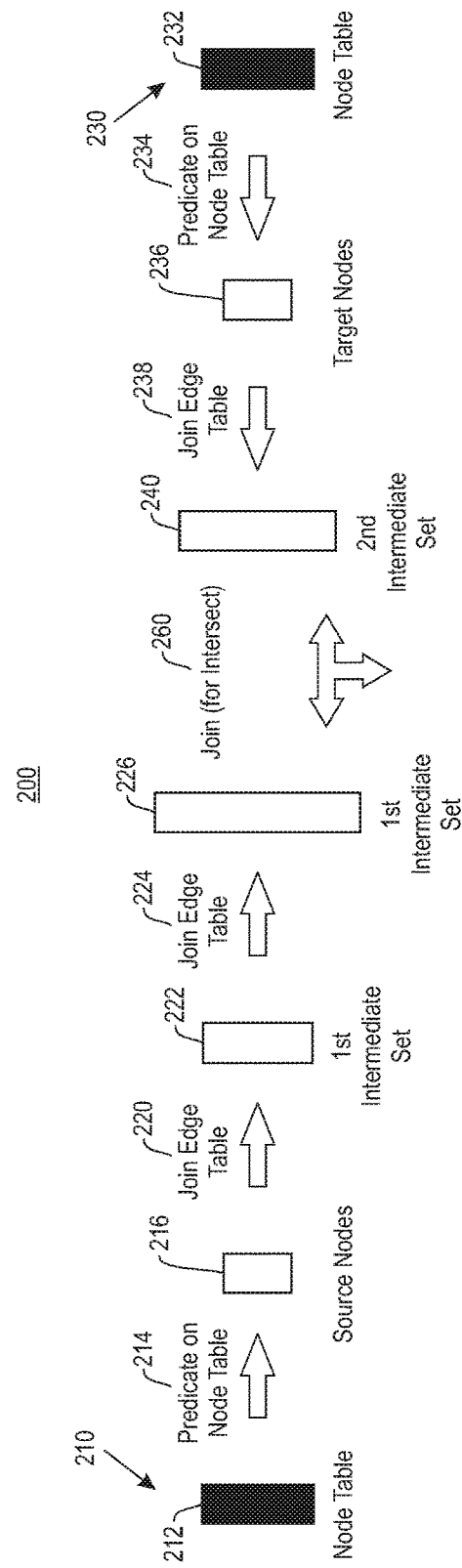
FIG. 2 depicts a block diagram illustrating an example of the graph query process as shown and described in FIG. 1.

Referring to FIG. 2, a block diagram (200) is provided illustrating an example of the graph query process as shown and described in FIG. 1. Two separate sub-processes are represented, with one sub-process directed to a set of sources nodes (210) and another sub-process directed to a set of target nodes (230). As shown, a source predicate (214), such as a node condition, is applied to the node table (212) to produce the set of source nodes (216). The set of source nodes (216) are joined with edge table (220) producing a first intermediate set (222). The first intermediate set (222) is subsequently joined with the edge table (220), producing a second first intermediate set (226). Similarly, a target predicate (234), such as a node condition, is applied to the node table (212) to produce the set of target nodes (236). Then edge table (220) is joined with the set of target nodes (236), producing a second intermediate set (240). The first and second intermediate sets (226) and (240), respectively, are then shown herein as being joined (260).

The following is pseudo code illustrating the program code algorithm for executing the graph path query shown and described in FIG. 1.

(1) Apply selection criteria on source nodes, PredVs, to create a set of source nodes Vs;
(2) Set a first intermediate set of paths to Ps = Vs;
(3) Set a max length of the paths in Ps to ls = 0; //initially path length is 0//
(4) Apply selection criteria on target nodes, PredVt, on node table to create a set of target node Vt;
(5) Set a second intermediate set of paths to Pt = Vt;
(6) Set a max length of paths in Pt to lt = 0; //initially path length is 0//
(7) While ls + lt < path length, 1, do:
  /*decided which end to grow based on the cost of the operation */
  (8) If joining Ps with EdgeTable is cheaper than joining EdgeTable with Pt then
    (9) Ptemp = join Ps with EdgeTable and apply selection criteria on edges, PredE;
    (10) Ps = Ps ∪ Ptemp;
    (11) ls = ls + 1;
  (12) else
    (13) Ptemp = join EdgeTable with Pt and apply PredE;
    (14) Pt = Pt ∪ Ptemp;
    (15) lt = lt + 1
(16) Join Ps and Pt // interest the corresponding two sets of intermediate nodes//

The intermediate sets of paths, Ps and Pt, can be represented as temporary tables in the database.

Figure 3:
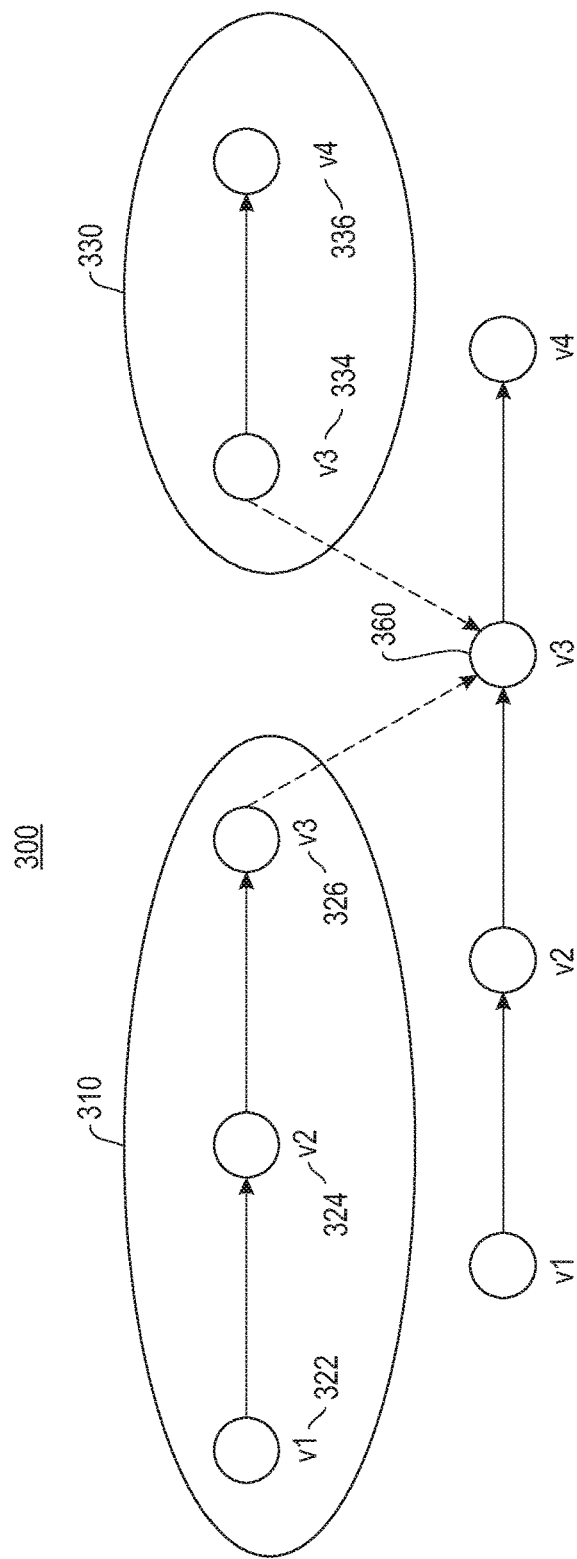
FIG. 3 depicts a block diagram illustrating a block diagram showing an abstraction of the graph path query shown in FIG. 2.

Referring to FIG. 3, a block diagram (300) is provided showing an abstraction of the graph path query example shown in FIG. 2. Like numbers are shown to illustrate the similarity to the tables and associated table joins shown and described in FIG. 2. There are two paths illustrated. The first path (310) represents the nodes sets prior to the intersection at (260). For the source node set, v1 (322) represents the first intermediate set, v2 (324) represents the edge table join, and v3 (326) the second first intermediate set. For the target node set (330), v4 (336) represents the target nodes, and v3 (340) represents the second intermediate set. The second first intermediate set (326) is joined with the second intermediate set (340) at (360). In the pseudo code, Ps is used to denote the set of first paths and Pt is used to denote the set of second paths. Both Ps and Pt can be represented as temporary tables in the database. Based on the pseudo code and the abstraction of the graph path query shown in FIG. 3, the first path (310) may be represented as v1→v2→v3, with a corresponding tuple in the table Ps, represented as [pathNodes, endNode], where pathNodes=(v1, v2, v3) and endNode=v3. Similarly, the second path (330) may be represented as v3→v4, with a corresponding tuple in the table Pt, represented as [startNode, pathNodes], where startNode=v3 and pathNodes=(v3,v4). In lines 2 and 5 of the pseudo code, Ps and Pt are initially set to the source nodes and the target nodes, respectively. Accordingly, the pathNodes fields of both tables contain an empty array for all tuples in the corresponding table. Referring to the pseudo code, line 9 represents the join of Ps with the Edge Table, which in one embodiment is a join of the temporary table Ps with the EdgeTable so that the end node of Ps is set to the start node of the Edge Table, with the result of the join being stored back to the temporary table Ps. Similarly, line 13 of the pseudo code represents a join of the EdgeTable with the temporary table of Pt so that the end node of the EdgeTable is set to the start node of the temporary table Pt, with the result of the join being stored back to the temporary table Pt. Line 16 of the Pseudo code represents a join of the temporary tables Ps and Pt so that the end node of Ps is set to the start node of Pt.

The process of joining tables in execution of a graph query supports dynamic adjustment of execution of the plan based on performance of the query processing. More specifically, statistics are collected after each operator or a sequence of operators. The most efficient operator is selected based on the collected statistical data. Accordingly, as operations are executed in the query plan, the estimates are subject to updating so that the query plan may be dynamically adjusted to respond to the collected data and to bring efficiency into the query execution.

Figure 4:
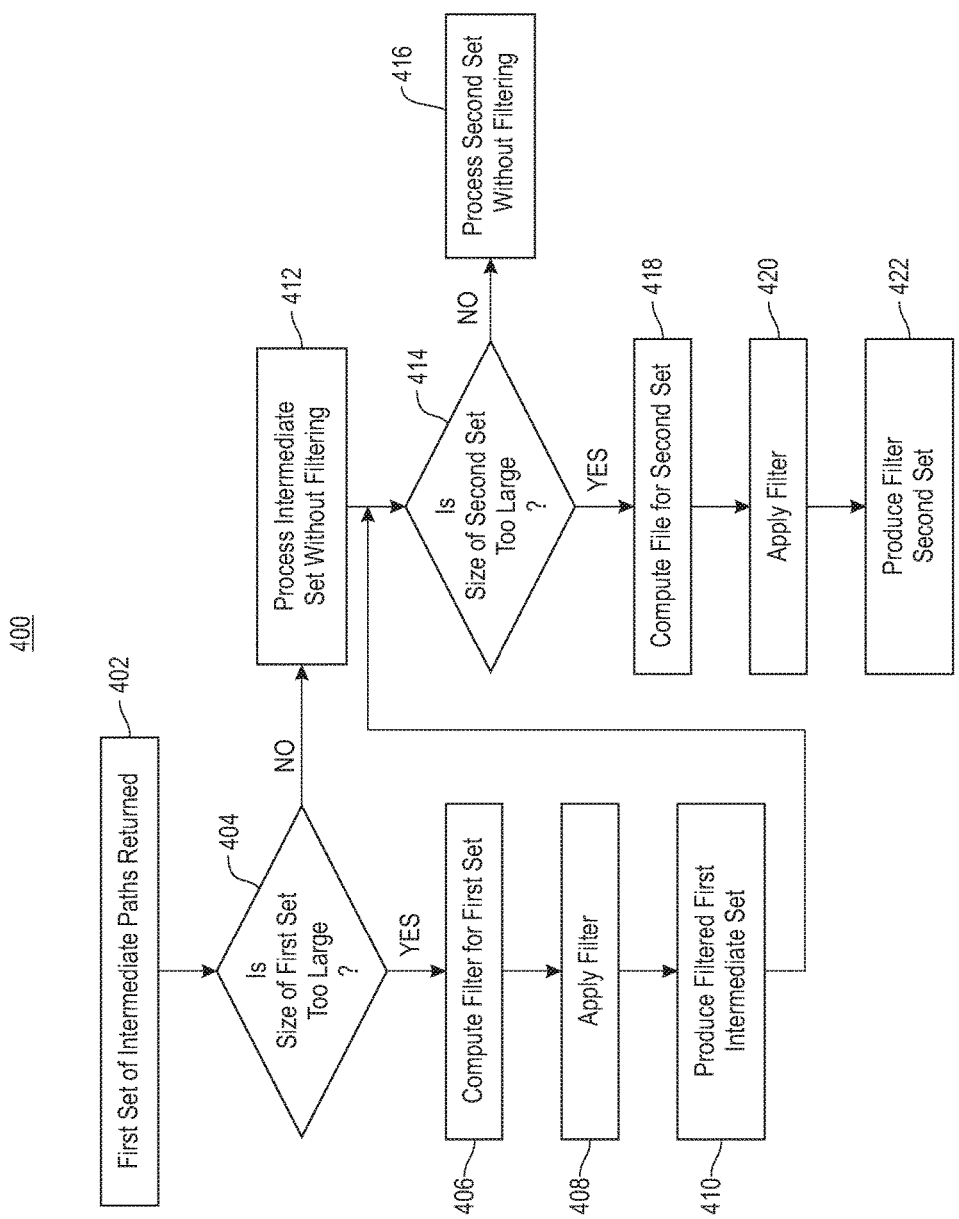
FIG. 4 depicts a flow chart illustrating a process for applying a filter to the intermediate sets.

When the first and second intermediate sets of nodes are created, either or both of these sets may yield large results which are inefficient to process. In one embodiment, a filter may be applied to either or both of the intermediate sets to filter data and thereby eliminate non-joinable results, effectively speeding up the join process. Referring to FIG. 4, a flow chart (400) is provided illustrating a process for applying a filter to the intermediate sets. The order of processing the intermediate sets as shown herein should not be considered limiting, and in one embodiment may be reversed. As shown, a first set of intermediate paths is returned (402). It is determined if the size of the first set is too large for processing (404). In one embodiment, the size element is a subjective quantity and may come in the form of a threshold value. Similarly, in one embodiment, the assessment at step (404) pertains to a manageable size for processing, with the size determination associated with resource utilization or anticipated resource utilization. An affirmative response to the determination at step (404) is followed by computing a filter for the first set (406), and applying the filter to the first set (408) to produce a filtered first intermediate set (410). A non-affirmative response to the determination at step (404) is followed by processing the first intermediate set without filtering (412). In one embodiment, the computed and applied filter is a bloom filter. Similarly, in one embodiment, the filter is uni-directional and application of the filter is limited to the first set. Accordingly, a filter is computed for the first set to reduce the quantity of join results present in the first intermediate set thereby yielding a manageable size for the first intermediate set.

Each set of intermediate results may be separately evaluated for processing, and more specifically for size and manageability assessment. Following steps (410) or (412) it is determined if the size of the second set is too large for processing (414). A negative response is followed by processing the second intermediate set without filtering (416). However, an affirmative response to the determination at step (412) is followed by computing a filter for the second set (418), and applying the filter to the second set (420) to produce a filtered second intermediate set (422). In one embodiment, the computed and applied filter is a bloom filter. Similarly, in one embodiment, the filter is uni-directional and application of the filter is limited to the second set. Accordingly, a filter may be computed for the second set to reduce the quantity of join results present in the second intermediate set thereby yielding a manageable size for the second intermediate set.

As shown in FIG. 4, a separate filter may be computed and applied to respective intermediate sets depending on the need for filtering. These filters are referred to herein as uni-directional filters. In one embodiment, an assessment that both intermediate sets require filtering may require employing a filter to each set, also referred to herein as a two-way filter or a bi-directional filter. Regardless of the quantity of filters computed, the function of the filter(s) is to parse data from the respective intermediate sets that contain non-joinable results and are determined not to be a part of the intersection of the intermediate sets.

Application of a filter, either uni-directional or bi-directional, may be to one or both of the intermediate sets. In one embodiment, the applied filter is a Bloom filter, which is a bit array of m bits with k hash functions defined to summarize a set of elements. Adding an element to the Bloom filter involves applying the k hash functions on the element and setting the corresponding positions of the bit array to 1. Symmetrically, testing whether an element belongs to the set requires applying the hash functions and checking whether all of the corresponding bit positions are set to 1. Building a Bloom filter on join keys of one table can be used to prune out non-joinable records from another table. In one embodiment, a false positive rate may be employed. As articulated, the filter may be a uni-directional Bloom filter or a Bi-directional Bloom filter.

Figure 5:
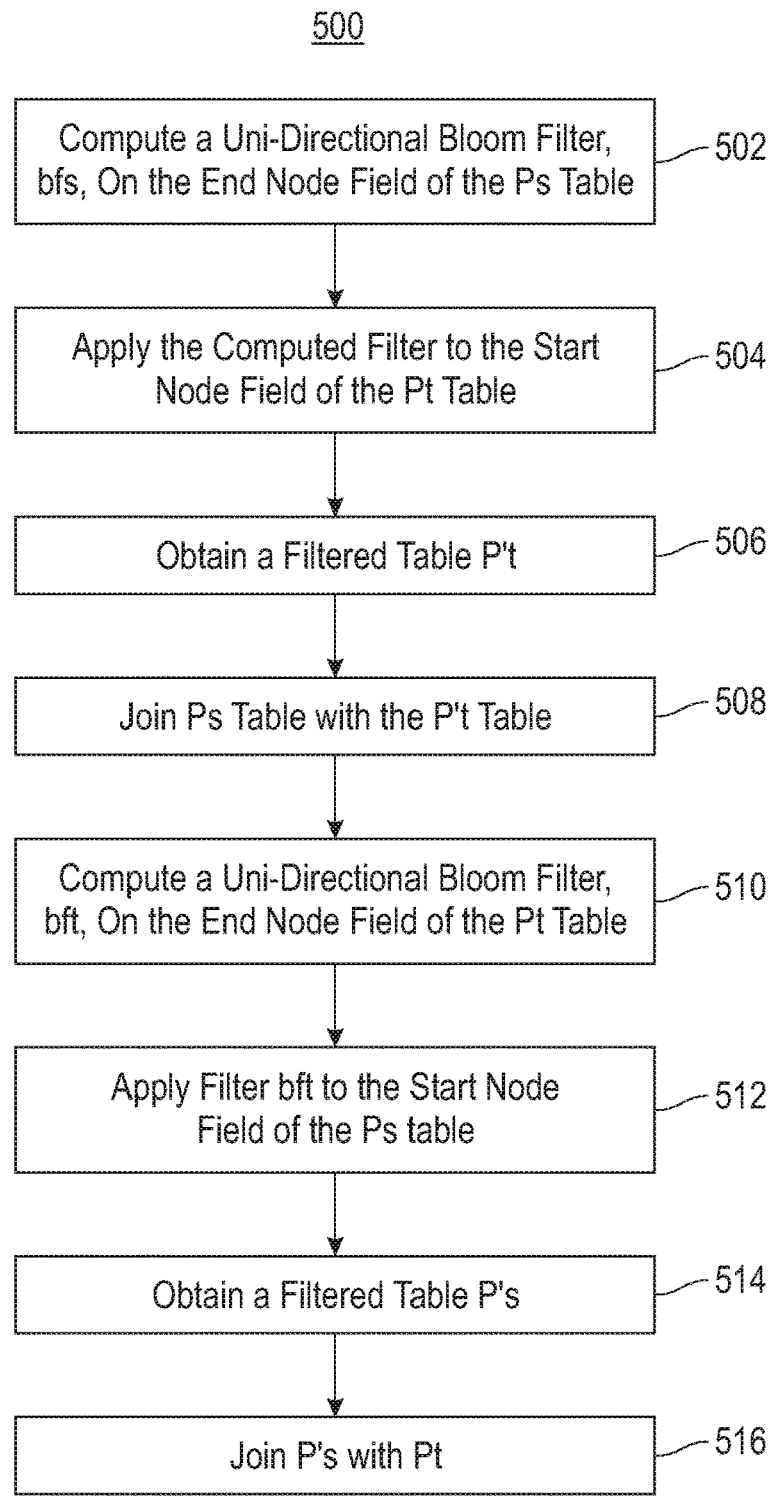
FIG. 5 depicts a flow chart illustrating an example computation and application of a uni-directional Bloom filter.

Referring to FIG. 5, a flow chart (500) is provided demonstrating an example computation and application of a uni-directional Bloom filter. As shown, a uni-directional Bloom filter, bfs, is computed on the end node field of the Ps table (502). The computed filter is applied to the start node field of the Pt table (504) to obtain a filtered table P't (506), which contains a smaller quantity of records that table Pt. Following step (506), the Ps table is joined with the P't table (508). Similarly, a uni-directional Bloom filter, bft, is computed on the end node field of the Pt table (510). Filter bft is applied to the start node field of the Ps table (512) to obtain a filtered table P's (514), before joining P's with Pt (516).

Figure 6:
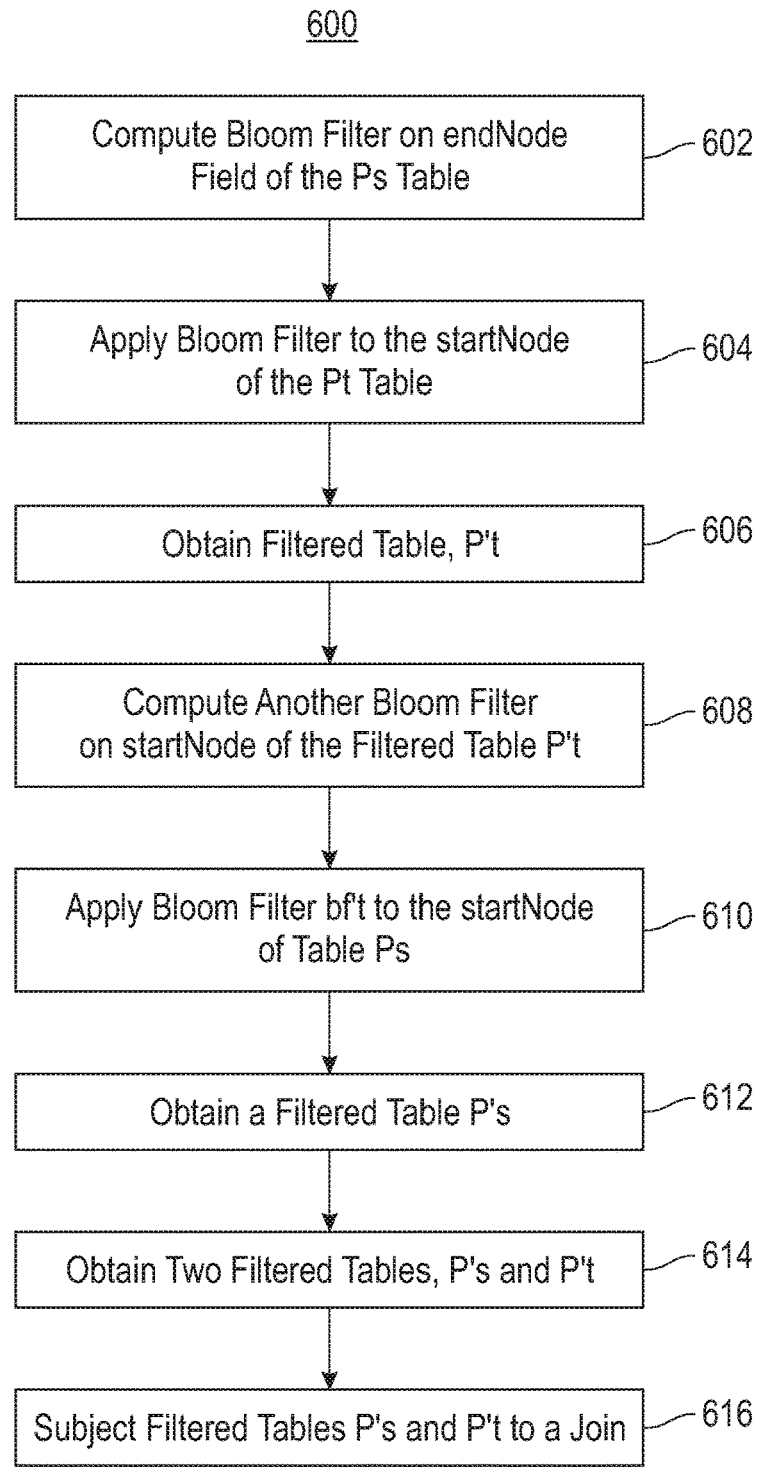
FIG. 6 depicts a flow chart illustrating an example computation and application of a bi-directional Bloom filter.

Application of a bi-directional Bloom filter applies the same hash functions to both sets of results. Referring to FIG. 6, a flow chart (600) is provided demonstrating an example computation and application of a bi-directional Bloom filter. As shown, a Bloom filter bfs is computed on the endNode field of the Ps table (602), and then applied to the startNode of the Pt table (604) to obtain a filtered table P't (606). At the same time, another Bloom filter, bft, is computed on the startNode of the filtered table P't (608). Bloom filter, bft, is then applied to the startNode of table Ps (610) to obtain a filtered table P's (612). Once the two filtered tables, P's and P't are obtained (614), they are subject to a join (616).

Figure 7:
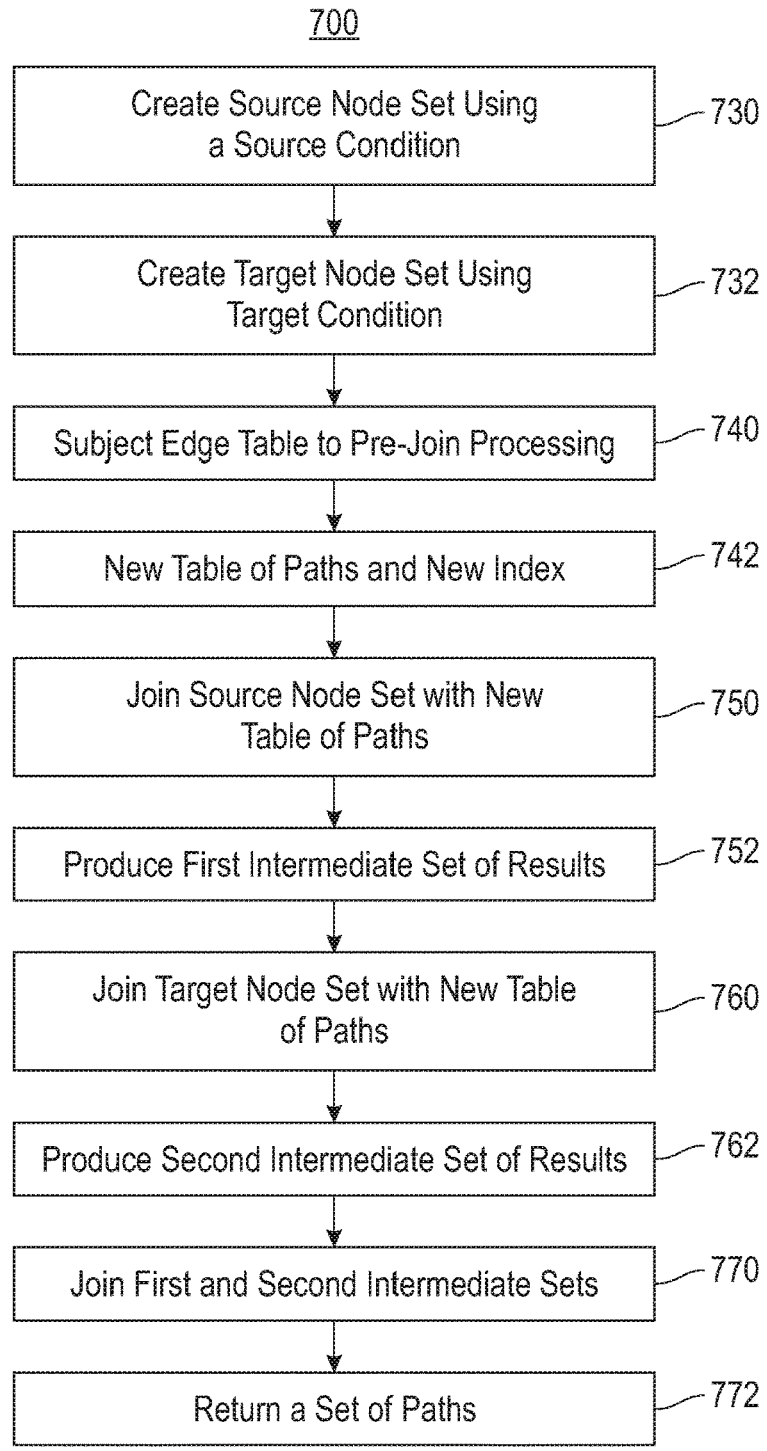
FIG. 7 depicts a flow chart illustrating a process for pre-join processing.

In one embodiment, the number of intersections when subjecting the intermediate sets to a join may be reduced through pre-join processing. Referring to FIG. 7, a flow chart (700) is provided illustrating a process for pre-join processing. As shown, a set of source nodes is created using a source condition (712), and a set of target nodes is created using a target condition (732). The edge table is subject to pre-join processing (740) which creates a new table of paths (742). In one embodiment, the new table of paths created at step (742) is referred to as a join index. More specifically, the pre-joining processing at step (740) reduces the quantity of join operations for producing the set of result items. The source node set (712) is joined with the new tables of paths (750) producing a first intermediate set of results (752). Similarly, the target node set (732) is joined with the new table of paths (760) producing a second intermediate set of results (762). The first and second intermediate sets (752) and (762), respectively, are joined (770) and a result set of paths is returned (772). Accordingly, the pre-join processing shown herein reduces the number of join operations.

In addition to the pre-join processing shown and described in FIG. 7, a uni-directional filter or a bi-directional filter may be applied to the first and second intermediate sets. As shown and described in FIG. 2, the filter or filters are applied to the intermediate results sets. Application of the filters may be determined after steps (752) and (762), respectively, and applied to one or both of the respective sets thereby reducing the quantity of data items from each intermediate set that is subject to the joining of the respected paths.

Figure 8:
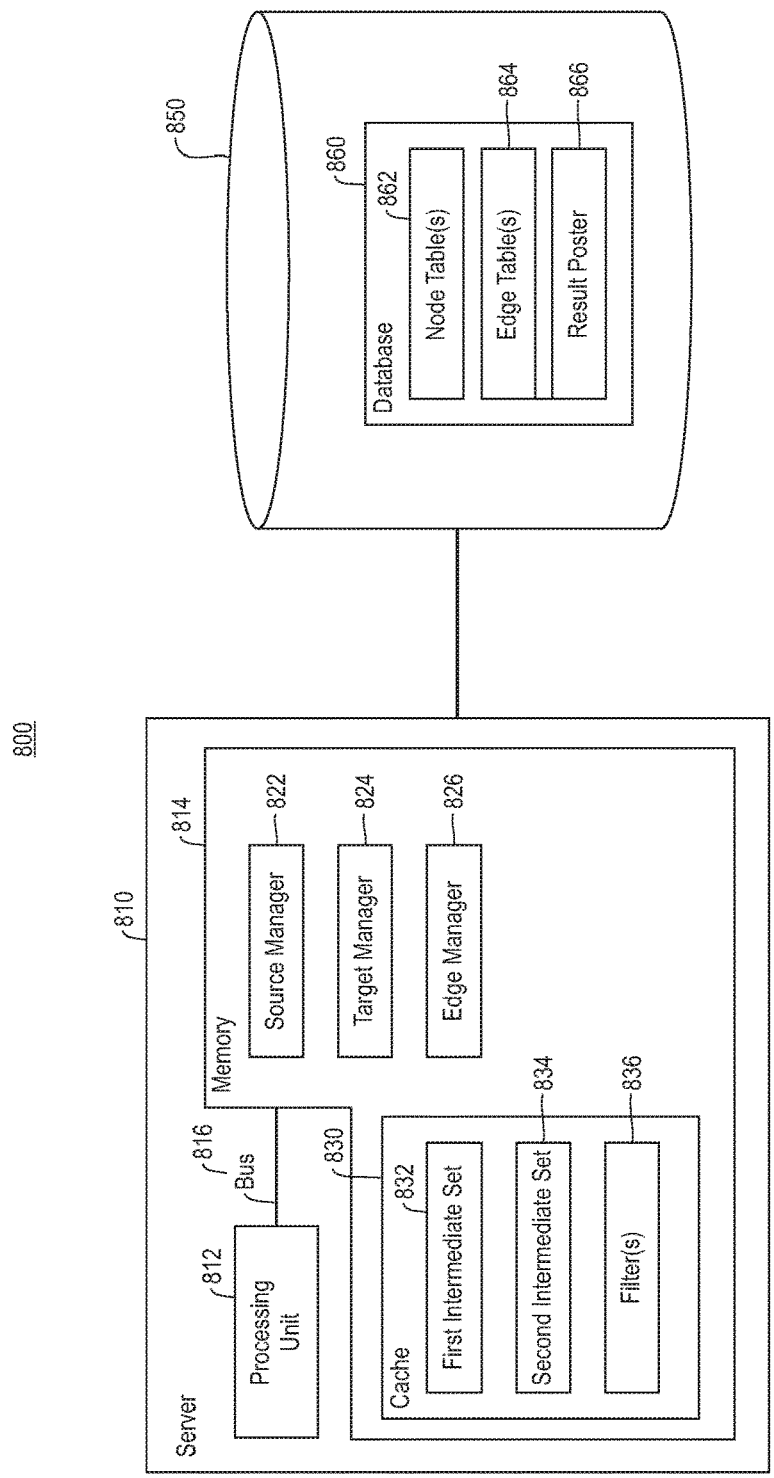
FIG. 8 depicts a block diagram illustrating a computer system for executing the graph path queries described above in FIGS. 1-7.

As shown in FIGS. 1-7, processes and associated examples are provided to demonstrate executing graph path queries in a relational database, and more specifically, processes for filtering data to enhance the efficiency of the join operation. With reference to FIG. 8, a block diagram (800) is provided illustrating a computer system for executing the graph path queries described above in FIGS. 1-6. Two primary components are shown, including a server (810) and data storage (850). Although a single data storage component is show, in one embodiment, there may be a plurality of persistent storage devices in communication with the server. A database (860) is shown local to persistent storage (850). In one embodiment, the database is a relational database and is configured with a plurality of tables and associated attributes, including one or more node tables (862) and one or more edge tables (864). Accordingly, nodes and associated node attributes are organized and stored in one or more node tables (862) and edges and associated edge attributes are organized and stored in one or more edge tables (864).

The server described above in FIG. 8 is shown with a processing unit (812) in communication with memory (814) across a bus (816). The server (810) has been labeled with tools to facilitate processing of graph queries. Such tools include, but are not limited to, a source manager (822), a target manager (824), and an edge manager (826). The managers (822)-(826) are shown herein embedded in memory (814), although this location should not be considered limiting. Furthermore, the graph query processing performed by the tools yield several data sets and filters, which are shown herein stored in cache memory (830), although in one embodiment the data sets and/or filters may be stored in an alternate transient memory location. The data sets and filters include, but are not limited to, a first intermediate set (832), a second intermediate set (834), and one or more filters (836), which in one embodiment may take the form of a bloom filter.

The source manager (822) functions for application of one or more conditions to the node table(s) (862) and through application of joins and conditions to produce the first intermediate set (832) associated with source nodes. Similarly, the target manager (824) functions for application of one or more conditions to the node table(s) (862) and through application of joins and conditions produces the second intermediate set (834) associated with the target nodes. A result path (866) is returned from performing a join of the first and second intermediate sets (832) and (834), respectively. A restriction in the form of a length condition is applied to the result path (866).

To enhance efficiency and processing of the query, one or more filters may be computed and applied to the intermediate sets. As shown here, a filter (836) is shown in cache memory (830). The filter (836) may be computed by the source manager (822) or the target manager (824) depending on its application. For example, the source manager (822) may compute the filter (836) and apply the filter to the intermediate sets of nodes, including the first and second sets (832) and (834), respectively. In one embodiment, the target manager (842) may compute the filter (836) and apply the filter to the intermediate sets of nodes. The filter (836) may be uni-directional or in one embodiment bi-directional.

Another form of efficiency to the graph path query processing employs pre-join processing. As shown herein, the edge manager (826) may apply pre-join processing to the edge table (864), resulting in a new tables of paths (866) that includes a new index. More specifically, the function of the pre-join processing reduces the quantity of join operations. The edge manager (826) may also compute and apply a filter (836), either uni-directional or bi-directional, to one or more of the intermediate sets (832) and (834), respectively. The pre-join processing and the filter computation and application provide efficiency of the query processing by removing data from the query that is not relevant.

The tools, such as the managers (822)-(826) may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 9:
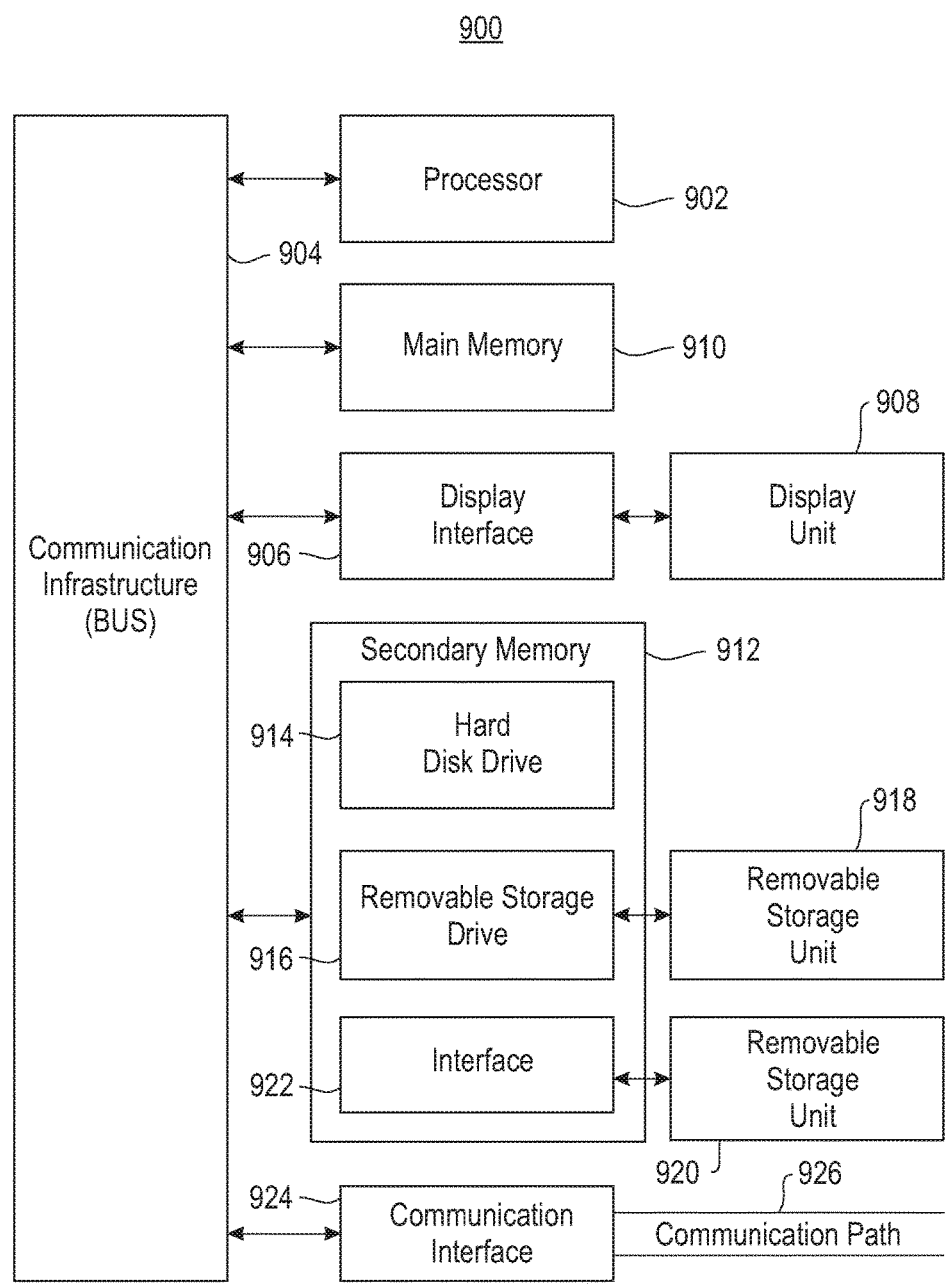
FIG. 9 depicts a block diagram showing a system for implementing the tools of FIG. 8.

Referring now to the block diagram of FIG. 9, additional details are now described with respect to implementing an embodiment of the present invention. The computer system includes one or more processors, such as a processor (902). The processor (902) is connected to a communication infrastructure (904) (e.g., a communications bus, cross-over bar, or network).

The computer system can include a display interface (906) that forwards graphics, text, and other data from the communication infrastructure (904) (or from a frame buffer not shown) for display on a display unit (908). The computer system also includes a main memory (910), preferably random access memory (RAM), and may also include a secondary memory (912). The secondary memory (912) may include, for example, a hard disk drive (914) and/or a removable storage drive (916), representing, for example, a floppy disk drive, a magnetic tape drive, or an optical disk drive. The removable storage drive (916) reads from and/or writes to a removable storage unit (918) in a manner well known to those having ordinary skill in the art. Removable storage unit (918) represents, for example, a floppy disk, a compact disc, a magnetic tape, or an optical disk, etc., which is read by and written to by removable storage drive (916).

In alternative embodiments, the secondary memory (912) may include other similar means for allowing computer programs or other instructions to be loaded into the computer system. Such means may include, for example, a removable storage unit (920) and an interface (922). Examples of such means may include a program package and package interface (such as that found in video game devices), a removable memory chip (such as an EPROM, or PROM) and associated socket, and other removable storage units (920) and interfaces (922) which allow software and data to be transferred from the removable storage unit (920) to the computer system.

The computer system may also include a communications interface (924). Communications interface (924) allows software and data to be transferred between the computer system and external devices. Examples of communications interface (924) may include a modem, a network interface (such as an Ethernet card), a communications port, or a PCMCIA slot and card, etc. Software and data transferred via communications interface (924) is in the form of signals which may be, for example, electronic, electromagnetic, optical, or other signals capable of being received by communications interface (924). These signals are provided to communications interface (924) via a communications path (i.e., channel) (926). This communications path (926) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (910) and secondary memory (912), removable storage drive (916), and a hard disk installed in hard disk drive (914).

Computer programs (also called computer control logic) are stored in main memory (910) and/or secondary memory (912). Computer programs may also be received via a communication interface (924). Such computer programs, when run, enable the computer system to perform the features of the present invention as discussed herein. In particular, the computer programs, when run, enable the processor (902) to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The implementation of the graph query processing employing intermediate sets of paths and an associated intersection of these paths together with a length condition optimizes the processing. Computation and application of filter enhances the optimization by eliminating non-joinable results from the processing.

It will be appreciated that, although specific embodiments of the invention have been described herein for purposes of illustration, various modifications may be made without departing from the spirit and scope of the invention. In particular, nodes and edges of graphs could be stored as files on a file system, and join operations could be carried out directly on the corresponding files. Accordingly, the scope of protection of this invention is limited only by the following claims and their equivalents.

We claim:

1. A computer-implemented method for processing a graph path query, wherein the graph path query retrieves paths and each path being a sequence of connected edges, the method comprising:
   storing data entities and data attributes in a node table;
   storing links between nodes identified in the node table in an edge table, the edge table including a plurality of edges between a source node and a target node, and attributes of the edges;
   applying a selection condition to the node table and generating a set of source nodes;
   joining the source node set with the edge table and applying an edge condition, the application producing a first edge of a first plurality of edges in a first path;
   traversing the first path, including joining the first edge with the edge table and producing a first intermediate set of paths, wherein the first intermediate set of paths comprises paths with edges satisfying the edge condition and connecting the source nodes to a first set of intermediate nodes;
   computing a uni-directional bloom filter on the first set of intermediate nodes;
   applying a selection condition to the node table and generating a set of target nodes;
   joining the target node set with the edge table and applying the edge condition, the application producing a second edge of a second plurality of edges in a second path;
   in reverse direction, traversing the second path, including joining the edge table with the second edges in the second path, and producing a second intermediate set of paths, wherein the second intermediate set of paths comprises paths with edges satisfying the edge condition and connecting the target nodes to a second set of intermediate nodes;
   applying the bloom filter to the second set of intermediate nodes, application of the filter reducing a quantity of data items resulting from the traversal from the selected intermediate paths; and
   returning a set of result paths by joining the first intermediate set of paths with the second set of intermediate paths, including intersecting the first set of intermediate nodes with the second set of intermediate nodes, and applying a length condition to the set of result paths.

2. The method of claim 1, further comprising computing a uni-directional bloom filter on the second set of intermediate nodes, and applying the bloom filter on the first set of intermediate nodes, application of the filter reducing the quantity of data items resulting from the traversal from the selected intermediate paths.

3. The method of claim 1, further comprising computing a second bloom filter on the second set of intermediate nodes, applying the bloom filter on the first set of intermediate nodes, application of the filter reducing the quantity of data items resulting from the traversal from the selected intermediate paths.

4. The method of claim 1, further comprising applying pre-join processing to the edge table, and creating a new table of paths, the pre-join processing reducing a quantity of join operations.

5. The method of claim 4, further comprising applying a uni-directional bloom filter to one of the first and second intermediate set of paths.

6. The method of claim 4, further comprising applying a bi-directional bloom filters to both the first and second intermediate set of paths.

7. A computer program product comprising a computer readable storage medium having computer readable program code embodied therewith, the program code executable by a processor to process a graph path query with data entities and attributes stored in a node table and links between nodes identified in the node table stored in an edge table, the edge table including a plurality of edges between a source node and a target node, and attributes of the edges, the processor to:
   apply a selection condition to the node table and generate a set of source nodes;
   join the source node set with the edge table and apply an edge condition, the application producing a first edge of a first plurality of edges in a first path;
   traverse the first path, including join the first edge with the edge table and produce a first intermediate set of paths, wherein the first intermediate set of paths comprises paths with edges satisfying the edge condition and connecting the source nodes to a first set of intermediate nodes;
   compute a uni-directional bloom filter on the first set of intermediate nodes;
   apply a selection condition to the node table and generating a set of target nodes;
   join the target node set with the edge table and apply the edge condition, the application producing a second edge of a second plurality of edges in a second path;
   in reverse direction, traverse the second path, including joining the edge table with the second edges in the second path, and produce a second intermediate set of paths, wherein the second intermediate set of paths comprises paths with edges satisfying the edge condition and connecting the target nodes to a second set of intermediate nodes;

apply the bloom filter to the second set of intermediate nodes, application of the filter reducing a quantity of data items resulting from the traversal from the selected intermediate paths; and return a set of result paths by joining the first intermediate set of paths with the second set of intermediate paths, including an intersection of the first set of intermediate nodes with the second set of intermediate nodes, and application of a length condition to the set of result paths.

8. The computer program product of claim 7, further comprising the processor to compute a uni-directional bloom filter on the second set of intermediate nodes, and apply the bloom filter on the first set of intermediate nodes, application of the filter reducing the quantity of data items resulting from the traversal from the selected intermediate paths.

9. The computer program product of claim 7, further comprising the processor to compute a second bloom filter on the second set of intermediate nodes, and apply the bloom filter on the first set of intermediate nodes, application of the filter reducing the quantity of data items resulting from the traversal from the selected intermediate paths.

10. The computer program product of claim 7, further comprising the processor to apply pre-join processing to the edge table, and create a new table of paths, the pre-join processing reducing a quantity of join operations.

11. The computer program product of claim 10, further comprising the processor to apply a uni-directional bloom filter to one of the first and second intermediate set of paths.

12. The computer program product of claim 11, further comprising the processor to apply a bi-directional bloom filters to both the first and second intermediate set of paths.

13. A system comprising:
a processing unit in communication with memory;
a functional unit in communication with the processing unit, the functional unit having one or more tools to process a graph path query with data entities and attributes stored in a node table and links between nodes identified in the node table stored in an edge table, the edge table including a plurality of edges between a source node and a target node, and attributes of the edges,
the functional unit comprising a source manager and a target manager;
the source manager to:
apply a selection condition to the node table and generate a set of source nodes;
join the source node set with the edge table and apply an edge condition, the application producing a first edge of a first plurality of edges in a first path;
traverse the first path, and join the first edge with the edge table to produce a first intermediate set of paths, wherein the first intermediate set of paths comprises paths with edges satisfying the edge condition and connecting the source nodes to a first set of intermediate nodes; and
compute a uni-directional filter on the first set of intermediate nodes;
the target manager to:
apply a selection condition to the node table and generating a set of target nodes;
join the target node set with the edge table and apply the edge condition, the application producing a second edge of a second plurality of edges in a second path;
in reverse direction, traverse the second path, including joining the edge table with the second edges in the second path, and produce a second intermediate set of paths, wherein the second intermediate set of paths comprises paths with edges satisfying the edge condition and connecting the target nodes to a second set of intermediate nodes; and
and apply the filter to the second set of intermediate nodes, application of the filter to reduce a quantity of data items from traversal from the selected intermediate paths; and
a set of result paths returned from a join of the first intermediate set of paths with the second set of intermediate paths, and a length condition applied to the join.

14. The system of claim 13 further comprising the target manager to compute a second filter on the second set of intermediate nodes, and apply the filter on the first set of intermediate nodes, application of the filter to reduce the quantity of data items from the traversal from the selected intermediate paths.

15. The system of claim 13, wherein the functional unit further comprises an edge manager to apply pre-join processing to the edge table, and create a new table of paths, the pre-join processing to reduce the quantity of join operations.

16. The system of claim 15, further comprising the edge manager to apply a uni-directional filter to one of the first and second intermediate set of paths.

17. The system of claim 15, further comprising the edge manager to apply a bi-directional filter to both the first and second intermediate set of paths.

* * * * *